United States Patent
Champalou et al.

(10) Patent No.: US 9,562,600 B2
(45) Date of Patent: Feb. 7, 2017

(54) CAM FOLLOWER ROLLER DEVICE

(71) Applicants: François Champalou, Chaumont-sur-Loire (FR); Richard Corbett, Fondettes (FR); Aurelien Ghilbert-Simon, Saint Roch (FR); Benoît Hauvespre, Saint Etienne de Chigny (FR); Julien Maffucci, Pernay (FR)

(72) Inventors: François Champalou, Chaumont-sur-Loire (FR); Richard Corbett, Fondettes (FR); Aurelien Ghilbert-Simon, Saint Roch (FR); Benoît Hauvespre, Saint Etienne de Chigny (FR); Julien Maffucci, Pernay (FR)

(73) Assignee: AKTIEBOLAGET SKF, Gothenburg (SE)

( * ) Notice: Subject to any disclaimer, the term of this patent is extended or adjusted under 35 U.S.C. 154(b) by 47 days.

(21) Appl. No.: 14/575,002

(22) Filed: Dec. 18, 2014

(65) Prior Publication Data
US 2015/0176691 A1     Jun. 25, 2015

(30) Foreign Application Priority Data
Dec. 23, 2013  (FR) ...................... 13 63389

(51) Int. Cl.
| | |
|---|---|
| F16H 53/06 | (2006.01) |
| F16C 13/02 | (2006.01) |
| F02M 59/10 | (2006.01) |
| F02M 59/44 | (2006.01) |
| F01L 1/14 | (2006.01) |

(52) U.S. Cl.
CPC ................. *F16H 53/06* (2013.01); *F01L 1/14* (2013.01); *F02M 59/102* (2013.01); *F02M 59/44* (2013.01); *F02M 59/445* (2013.01); *F16C 13/02* (2013.01); *F01L 2105/00* (2013.01); *F01L 2105/02* (2013.01); *F02M 2200/02* (2013.01); *F02M 2200/9038* (2013.01); *Y10T 74/2107* (2015.01)

(58) Field of Classification Search
CPC ................ F01L 1/14; F01L 1/143; F01L 1/16; F01L 2105/02; F01L 2105/00; F16H 53/06; F02M 59/102
See application file for complete search history.

(56) References Cited

U.S. PATENT DOCUMENTS

| | | | | |
|---|---|---|---|---|
| 3,314,303 | A | * 4/1967 | Maat | .......................... F01L 1/14 123/90.5 |
| 3,596,533 | A | * 8/1971 | Nightingale | .......... F16C 13/006 384/127 |
| 4,776,710 | A | 10/1988 | Hara | |

(Continued)

FOREIGN PATENT DOCUMENTS

| | | |
|---|---|---|
| DE | 102006041673 A1 | 8/2007 |
| EP | 2672116 A1 | 12/2013 |

*Primary Examiner* — Thomas Diaz
(74) *Attorney, Agent, or Firm* — Bryan Peckjian; SKF USA Inc. Patent Dept.

(57) ABSTRACT

The cam follower roller device including a body, a shaft mounted on the body, a roller mounted on the shaft in a rotationally movable manner, and at least one friction element mounted on the shaft axially between the roller and the body. The friction element is separate from the body and from the roller.

8 Claims, 3 Drawing Sheets

(56) References Cited

U.S. PATENT DOCUMENTS

| | | | | |
|---|---|---|---|---|
| 5,960,758 A | * | 10/1999 | Giannone | F01L 1/14 123/90.42 |
| 6,289,765 B1 | * | 9/2001 | Clayson, III | F01L 1/14 123/90.16 |
| 6,334,416 B2 | * | 1/2002 | Okubo | 123/90.36 |
| 2013/0291817 A1 | * | 11/2013 | Noda | F01L 1/181 123/90.39 |

* cited by examiner

CAM FOLLOWER ROLLER DEVICE

CROSS REFERENCE TO RELATED APPLICATION

This is a United States Non-Provisional Patent Application claiming the benefit of France Patent Application Number FR1363389 filed on 23 Dec. 2013, which is incorporated herein by reference in its entirety.

TECHNICAL FIELD OF THE INVENTION

The present invention relates to the field of cam follower roller devices used in automotive or industrial applications.

BACKGROUND OF THE INVENTION

One advantageous application of the invention is the use of the cam follower roller device in a fuel injection pump intended for an internal combustion engine, in particular of a motor vehicle such as an automobile or lorry.

A device such as this comprises a tappet or body and a roller mounted to rotate on the body and intended to cooperate with a cam synchronized with the camshaft of the internal combustion engine so that the rotation of the camshaft leads to a periodic displacement of a piston of the injection pump that bears against the body, to allow fuel to be delivered.

Another advantageous application of the invention is the use of the device in a rocker system intended for controlling valves of an internal combustion piston engine.

In this application, the roller of the device is intended to cooperate, by rolling on it, with a cam of the camshaft of the internal combustion engine so that the rotation of the camshaft causes a periodic pivoting of a body of the device or of a rocker body, to open and close valves of the engine.

For these devices, the roller is generally mounted freely on a support shaft fixed to the body. During operation, and taking account of the forces applied to the device, in particular axial forces, contacts are produced between the roller and the body. Such axial contacts generate friction. Now, the body of these devices is generally obtained by forging, which generates a relatively high frictional torque, or even premature wear.

BRIEF SUMMARY OF THE INVENTION

The present invention aims to provide a cam follower roller device having reduced frictional torque and which is easy to manufacture and to assemble.

In one embodiment, the cam follower roller device comprises a body, a shaft mounted on the body, and a roller mounted on the shaft in a rotationally movable manner. The device further comprises at least one friction element mounted on the shaft axially between the roller and the body. The friction element is separate from the body and from the roller.

The interposition of at least one friction element axially between the roller and the body makes it possible to avoid direct axial contact between these two components. The frictional torque of the device is thus limited. The wear generated by axial contact between the friction element or elements, the roller and the body is limited.

Preferably, the roller comprises two end faces and the friction element is mounted axially between one of the end faces and the body. The roller may comprise an outer surface and a bore which are delimited axially by the end faces.

In one preferred embodiment, the device comprises at least two friction elements mounted on the shaft axially on either side of the roller. One of the friction elements may be arranged axially between one of the end faces of the roller and the body, and the other friction element may be arranged axially between the other end face of the roller and the body.

Advantageously, the friction element or elements are mounted freely on the shaft. The friction element or elements may be mounted freely in rotation on the shaft.

The floating or free assembly of the friction element or elements on the shaft makes it possible to further reduce the frictional torque of the device. Specifically, during operation, the friction element or elements may be driven to rotate by the roller but at a speed lower than that of the latter. Thus, the friction between the roller and the friction element or elements is small.

Alternatively or in combination, the friction element or elements may be mounted freely in translation on the shaft.

In one embodiment, the friction element or elements comprise at least one antifriction and/or wear-resistant coating. The coating may be arranged axially on the side of one of the end faces which is associated with the roller and/or axially on the body side.

The friction element or elements may be made of synthetic material, such as polyamide, or of metallic material. The friction element or elements may comprise a washer.

In one embodiment, the device additionally comprises a plain bearing interposed radially between the shaft and the roller.

In one embodiment, the ends of the shaft are fixed in holes in the body. Alternatively, the body may additionally comprise a support provided with open bearing surfaces supporting the ends of the shaft.

BRIEF DESCRIPTION OF THE DRAWINGS

The present invention will be better understood on reading the detailed description of embodiments given by way of non-limiting examples and illustrated by the appended drawings, in which.

DETAILED DESCRIPTION OF THE PRESENT INVENTION

Figure 1:
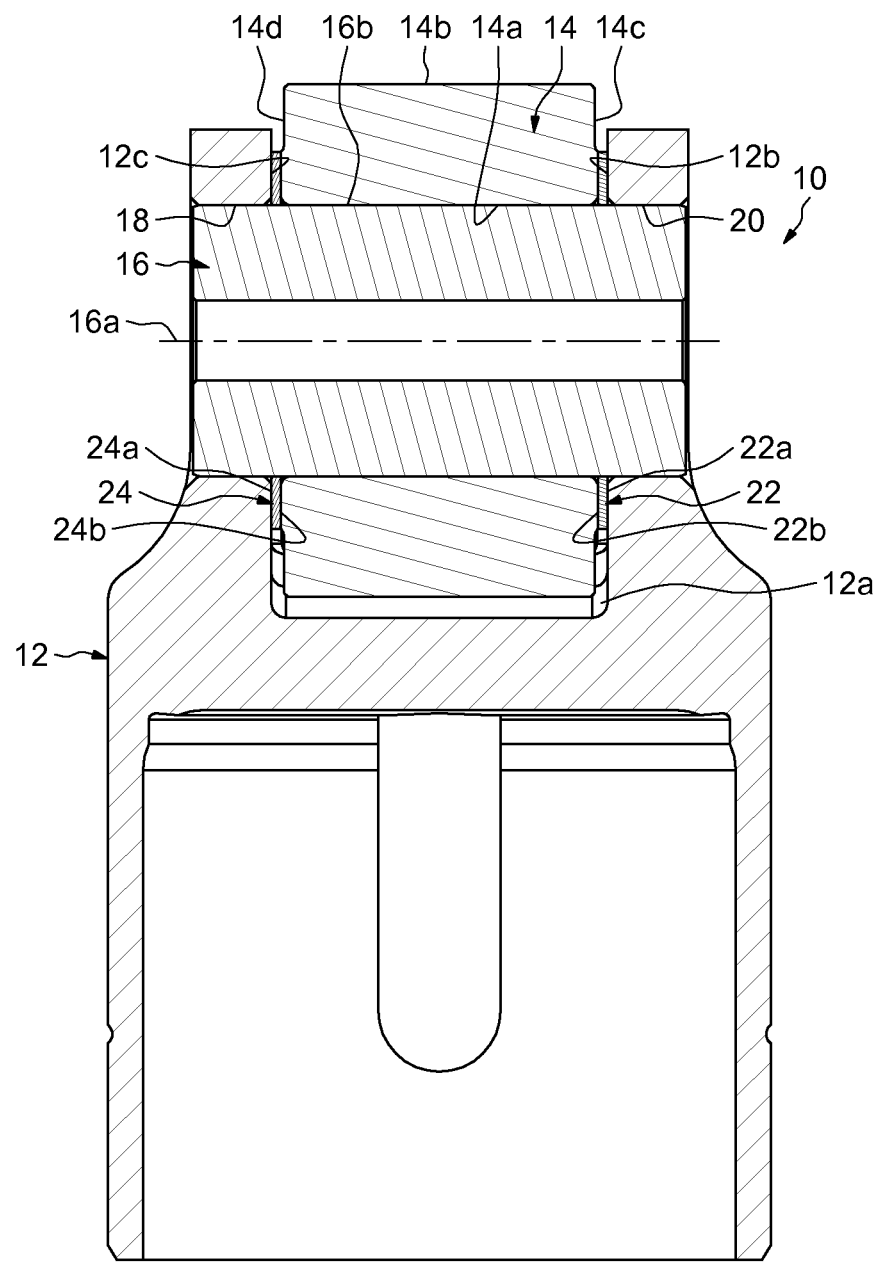
FIG. 1 is a view in section of a cam follower roller device according to a first example of the invention.

FIG. 1 shows a cam follower roller device, designated by the general reference number 10, which can for example be used in a fuel injection pump intended for an internal combustion engine.

The device 10 comprises a tappet or body 12 and a roller 14 mounted to rotate with respect to the body and intended to bear against a cam synchronized with the camshaft of the internal combustion engine or directly against a cam of the shaft. The body 12 delimits an outwardly open recess 12a inside which the roller 14 is mounted. The body 12 comprises two opposed radial front inner walls 12b, 12c axially delimiting the recess 12a. The roller 14 extends so as to project radially outside the body 12. The body 12 may advantageously be obtained at low cost by forging or by cutting, stamping and bending from a blank of thin metal sheet.

The device 10 also comprises a shaft 16, of geometric axis 16a, mounted on the body 12 and supporting the roller 14. The support shaft 16 comprises an axial cylindrical outer surface 16b on which the roller 14 is mounted. The shaft 16 extends axially on either side of the roller 14. The ends of the shaft are mounted inside through-holes 18, 20 formed in the body 12 axially facing one another. The holes 18, 20 extend from the inner walls 12b, 12c of the body. The shaft 16 is fastened by any suitable means to the body 12.

The roller 14 is mounted freely in rotation on the shaft 16. In the exemplary embodiment illustrated, the roller 14 is also mounted freely in translation on the shaft 16. The roller 14 comprises an axial cylindrical bore 14a mounted in direct radial contact with the outer surface 16b of the shaft and forming an inner surface, and an axial cylindrical outer surface 14b radially opposed to the bore. The outer surface 14b of the roller forms a contact surface intended to bear against the associated cam of the internal combustion engine.

The roller 14 also comprises two opposed radial front end faces 14c, 14d axially delimiting the bore 14a and the outer surface 14b. A part of the end faces 14c and 14d axially faces the inner walls 12b and 12c, respectively, of the body, i.e. is oriented outwardly. In the exemplary embodiment illustrated, the end faces 14c, 14d have a stepped shape. In a variant, the faces could be planar.

The device 10 also comprises friction washers 22, 24 in order to limit the axial friction between the roller 14 and the body 12. The washers 22, 24 are mounted on the shaft 16 axially between the roller 14 and the body 12. The friction washer 22 is interposed axially between the end face 14c of the roller and the body 12. The washer 24 is arranged axially between the opposed end face 14d of the roller and the body 12. The friction washers 22, 24 are mounted on the outer surface 16b of the shaft and centered on the axis 16a. The at least one friction element may have an axial cylindrical inner surface that contacts the axial cylindrical outer surface of the shaft. The friction washers 22, 24 are mounted freely on the shaft 16 in the axial and circumferential directions.

The friction washers 22, 24 are identical to one another. Each washer 22, 24 has an annular shape and is delimited axially by two opposed radial front faces 22a and 22b, 24a and 24b. The radial face 22a, 24a of each washer forms a friction surface with the body 12. The radial face 22b, 24b forms a friction surface with the roller 14. In the exemplary embodiment illustrated, the friction washers 22, 24 are axially in contact on one side against the roller 14 and axially on the other side against the body 12. Alternatively, during assembly, there may be provided axial clearances between the friction washers 22, 24, the body 12 and the roller 14. The friction washers 22, 24 are separate from the body 12, from the roller 14 and from the shaft 16. The washers 22, 24 are advantageously made of a material having a coefficient of friction which is reduced with respect to that of the body 12 and/or of the roller 14. The washers 22, 24 may for example be made of synthetic material such as polyamide which is or is not filled with mineral fibres, or of metallic material which is or is not ground.

In one variant embodiment, each radial face of the washers 22, 24 may comprise a coating in order to limit friction and/or wear. The coating may comprise diamond-like amorphous carbon. Diamond-like amorphous carbon is known internationally under the designation DLC. Such a coating offers numerous advantages including self-lubricating properties and good resistance to abrasive, adhesive or corrosive wear. In a variant, the coating may comprise tungsten disulphide (WS2), or black oxide ("black oxidizing"), or phosphate, or chromium nitride, or else titanium nitride. In a variant, it is possible to use any other coating having properties which make it possible to limit friction and/or to improve wear resistance. Each coating may entirely cover the associated radial face of the friction washer. For reasons associated with the process of depositing the coatings, the entirety of each friction washer 22, 24 may be covered by the same coating. In a variant, it could even be possible to provide a different coating on each of the radial faces of each friction washer 22, 24, or else a single coating per washer.

Figure 2:
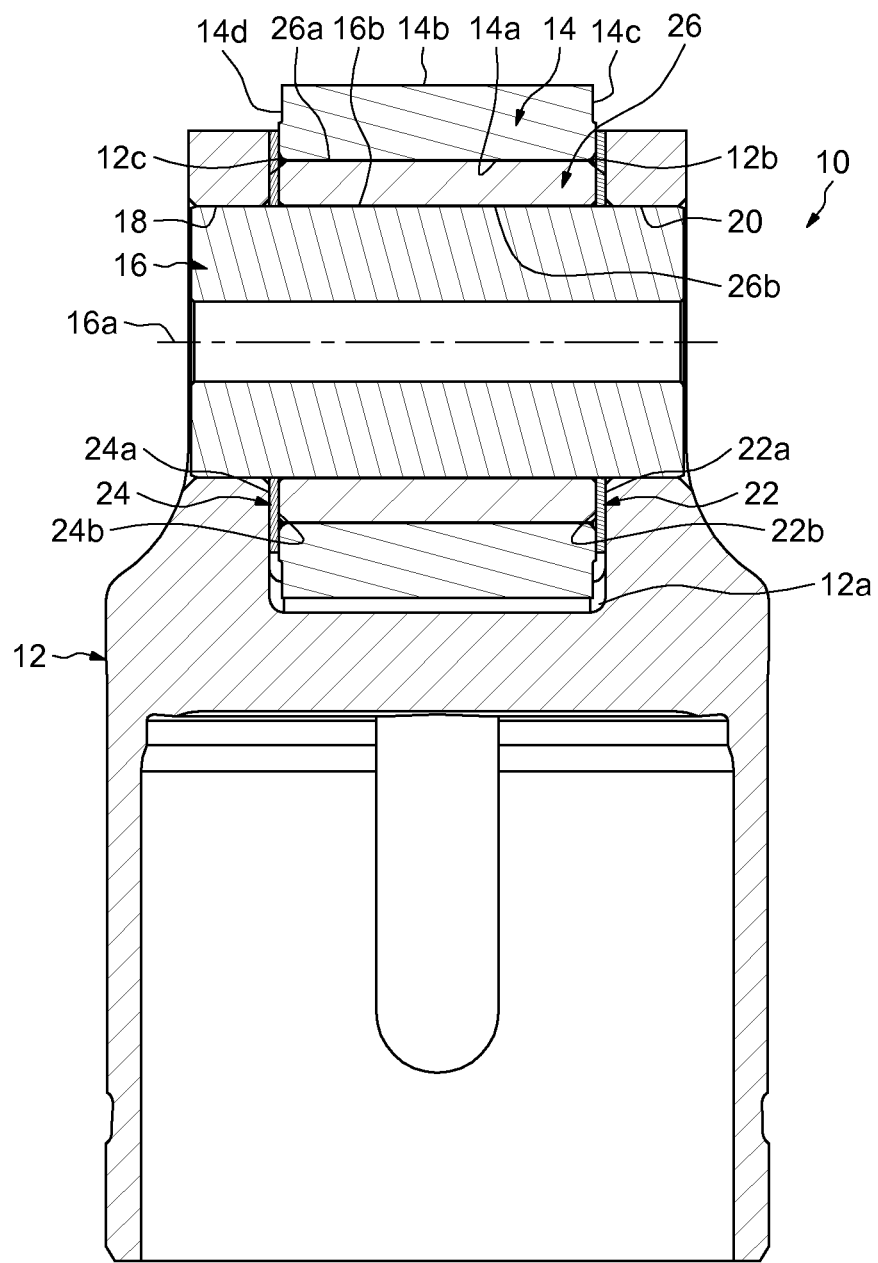
FIG. 2 is a view in section of cam follower roller devices according to a second example of the invention.

The exemplary embodiment illustrated in FIG. 2, in which identical elements bear the same references, differs in that the device 10 additionally comprises a plain bearing 26 interposed radially between the roller 14 and the shaft 16. The plain bearing 26 has an annular sleeve shape and is coaxial to the roller 14 and to the shaft 16. The bearing 26 comprises a cylindrical outer surface 26a mounted radially in contact against the bore 14a of the roller, and an opposed cylindrical bore 26b mounted radially in contact against the outer surface 16b of the shaft. The bearing 26 also comprises two opposed radial front end faces (not referenced) axially delimiting the outer surface 26a and the bore 26b. In the exemplary embodiment illustrated, each end face of the bearing 22 is flush with the associated end face 14c, 14d of the roller. The roller 14 is mounted on the shaft 16 via the bearing 26. The bearing 26 may be fastened to the roller 14 or to the shaft 16 or else mounted freely in rotation between them. The faces 22b, 24b of the washers form friction surfaces for the plain bearing 26 and for the roller 14. The washers 22, 24 are also separate from the bearing 26. In this exemplary embodiment, the washers 22, 24 have an increased radial dimension. In one variant embodiment, it could be possible to provide a needle bearing as a replacement for the plain bearing.

Figure 3:
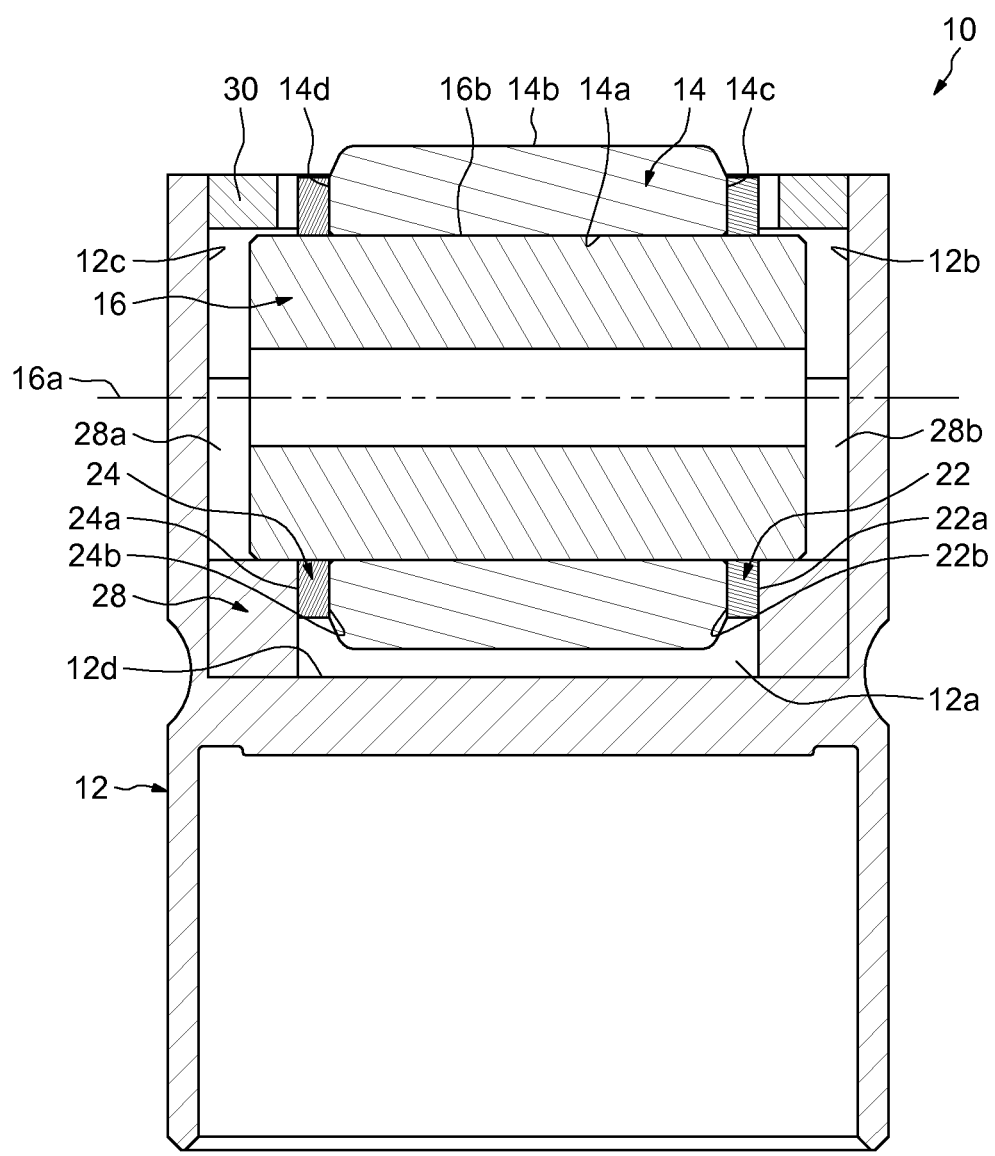
FIG. 3 is a view in section of cam follower roller devices according to a third example of the invention.

The exemplary embodiment illustrated in FIG. 3, in which identical elements bear the same references, differs mainly from the first exemplary embodiment described in that the device 10 comprises a support 28 mounted axially in bearing contact against an axial bottom wall 12d of the body which connects the inner walls 12b, 12c. The support 28 comprises bearings or bearing surfaces 28a, 28b which are open and oriented radially outwardly. The support 28 is fastened to the body 12 by any suitable means. The bearing surfaces 28a, 28b have a radially outwardly open semicircular profile with a diameter corresponding to the diameter of the shaft 16. The shaft 16 is mounted radially in contact against the bearing surfaces 28a, 28b of the support.

In this exemplary embodiment, the body 12 also comprises an annular retaining ring 30 fastened at its end in order to retain the roller 14 relative to the body during transport and assembly of the device 10. The friction washer 22 is interposed axially between, on the one hand the end face 14c of the roller 14 and, on the other hand, the ring 30 of the body and the support 28. The friction washer 24 is arranged axially between, on the one hand, the end face 14d of the roller 14 and, on the other hand, the ring 30 and the support 28. In the exemplary embodiment illustrated, the retaining ring 30 is an add-on part fastened to the body 12. Alternatively, it could be possible to form, at the end of the body 12, one or more local deformations of material so as to prevent the roller 14 being displaced out of the body 12 after assembly.

In the exemplary embodiments illustrated, the washers 22, 24 are flat. In a variant, the washers may have a stepped shape. In another variant, the washers may comprise, on one or both front faces, at least one projection delimiting a spherical portion able to come into contact with the associated element i.e. the roller or the body, or even the plain bearing. Thus, the washers offer a small friction zone, thereby further limiting the frictional torque of the device.

The present invention has been illustrated on the basis of a cam follower roller device which can for example be used in a fuel injection pump intended for an internal combustion engine. It is also possible, without departing from the scope of the invention, to provide a cam follower roller device in a rocker system which is used for the control of valves of an internal combustion engine and which comprises at least one friction washer mounted on the shaft axially between the roller and the body.

The invention claimed is:

1. A cam follower roller device comprising:
   a body;
   a shaft mounted on the body, the shaft having an axial cylindrical outer surface;
   a roller mounted directly on the shaft without another component therebetween in a rotationally movable manner, the roller having an outer contact surface delimited by a first end face and a second end face, each of the first and second end faces having a stepped shape in cross-section such that a first portion of the roller adjacent to the shaft has a greater axial length than a second portion of the roller that is radially spaced from the shaft, an axially extending step connecting the first and second portions; and
   a first friction element and a second friction element each mounted on the shaft axially between the roller and the body, each of the first and second friction elements being separate from the body and from the roller and each having an axial cylindrical inner surface that contacts the axial cylindrical outer surface of the shaft, the first friction element being mounted on the shaft axially between the first end face of the roller and the body, the second friction element being mounted on the shaft axially between the second end face of the roller and the body, each of the first and second friction elements are mounted freely on the shaft such that each of the first and second friction elements are able to rotate on the shaft and able to translate axially along the axial cylindrical outer surface of the shaft, and
   wherein each of the first and second friction elements axially overlap the first portion of the roller and do not axially overlap any portion of the second portion of the roller.

2. The cam follower roller device according to claim 1, wherein each of the first and second friction elements further comprises at least one of an antifriction coating and a wear-resistant coating.

3. The cam follower roller device according to claim 2, wherein the at least one of the antifriction coating and the wear-resistant coating is arranged on the first and second end faces of the roller and on the body.

4. The cam follower roller device according to claim 1, wherein the first and second friction elements are made of one of a synthetic material and a metallic material.

5. The cam follower roller device according to claim 4, wherein the synthetic material is a polyamide material.

6. The cam follower roller device according to claim 4, wherein the first and second friction elements are a metallic material.

7. The cam follower roller device according to claim 1, wherein the at least one friction element comprises a washer.

8. The cam follower roller device of claim 1, wherein each of the first and second friction elements comprises first and second axially opposed radial front surfaces, the first axially opposed radial front surface only contacts the first portion of the roller and the second axially opposed radial front surface is axially in contact with the body.

\* \* \* \* \*